United States Patent [19]

Okuma et al.

[11] 4,392,878
[45] Jul. 12, 1983

[54] GLASS FIBER FORMING UNIT

[75] Inventors: Kiwamu Okuma; Tsunehiro Haga; Masao Kizara; Keiji Otaki; Ayahiro Hirai, all of Koriyama, Japan

[73] Assignee: Nitto Boseki Co., Ltd., Fukushima, Japan

[21] Appl. No.: 330,261

[22] Filed: Dec. 14, 1981

[30] Foreign Application Priority Data

Dec. 19, 1980 [JP] Japan .................... 55/180207

[51] Int. Cl.$^3$ .................................. C03B 37/04
[52] U.S. Cl. ................................. 65/6; 65/14
[58] Field of Search ............................ 65/6, 14

[56] References Cited

U.S. PATENT DOCUMENTS

| 3,254,977 | 6/1966 | Levecque et al. | 65/6 |
| 3,395,005 | 7/1968 | Stelmah | 65/6 X |
| 3,928,009 | 12/1975 | Perry | 65/14 |

Primary Examiner—Robert L. Lindsay, Jr.
Attorney, Agent, or Firm—Gerald J. Ferguson, Jr.; Joseph J. Baker

[57] ABSTRACT

In a glass fiber forming unit including a hollow-cylinder-shaped rotating spinner having (a) a bottom, (b) a surrounding wall with a number of molten glass projecting orifices, and (c) an upper annular flange extending inwardly from the upper edge of the surrounding wall; and an attenuating blast burner with jet flame orifices for attenuating primary filaments formed at the tips of transition cones of molten glass projecting from the rotating spinner into secondary filaments, the improvement comprising the jet flame orifices in the attenuating blast burner being so positioned that, for each jet flame from each jet flame orifice, only an outer cone of flame is in contact with the lower portion of the outer surface of the surrounding wall of the hollow-cylinder-shaped rotating spinner where the speed of the outer cone of flame is such as to not break the transition cone of molten glass, and a heating burner disposed inside the upper annular flange of the hollow-cylinder-shaped rotating spinner for jetting a flame in a direction which is along the prolongation of the upper annular flange and which is in parallel with the surface of the upper annular flange, the flame from the heating burner heating the rotating spinner in such a manner that the flame goes along at least the upper surface of the upper annular flange to transmit heat to at least a corner where the upper annular flange of the hollow-cylinder-shaped rotating spinner and the surrounding wall meet.

4 Claims, 2 Drawing Figures

GLASS FIBER FORMING UNIT

BACKGROUND OF THE INVENTION

This invention relates to an improvement of a device which manufactures glass fibers by utilization of centrifugal force, and is intended to form glass fibers high in quality which form glass wool, and to economically use thermal energy.

In a device for manufacturing glas wool by utilization of centrifugal force, molten glass is introduced to the inner surface of the surrounding wall of a rotor which is rotated at high speed, for instance 3000 r.p.m., and is projected through a number of orifices in the surrounding wall of the rotor to form primary filaments. The primary filaments are attenuated into secondary filaments by the jet flame means. The secondary filaments thus formed are utilized to form glass wool.

In a device of this type, it can be observed that molten glass projected onto the outer surface of the surrounding wall of the rotor through a number of orifices in the surrounding wall are formed into transition cones of molten glass each having a small circular bottom corresponding to the opening area of the respective orifice on the outer surface of the wall. Primary filaments are formed at the tip of each transition cone of molten glass, and the primary filaments thus formed are advanced into jet flames which are adapted to subject the primary filaments to secondary attenuation, thus being formed into secondary filaments. In order to form the secondary filaments from the primary filaments, jet streams (such as jet flames or a jet air stream) the speed of which is high enough to cause secondary attenuation should not exist between the tip and the bottom of the transition cones of molten glass. The presence of such jet flames or jet air streams would break the transition cones of molten glass, and accordingly no primary filaments would be formed.

In the above-described device, the flow rate of molten glass passing through the many orifices in the rotor's wall is increased as the temperature of the molten glass is increased and accordingly the viscosity thereof is decreased. Of course, the flow rate is decreased as the temperature of the molten glass is decreased and accordingly the viscosity is increased. If the temperature of the molten glass is further decreased and accordingly the viscosity thereof is further increased, then the glass cannot pass through the orifices in the rotor's wall such that sometimes the supplied molten glass flows over the rotor. In this case, it is impossible to form desired fibers with the molten glass.

The viscosity of the molten glass is greatly affected by temperature. Therefore, maintaining at a predetermined temperature the molten glass passing through the orifices in the rotor's wall is essential in order that the flow rate of the molten glass projected through the orifices in the rotor's wall is maintained constant as are the diameters of primary filaments. Thus, fluctuation in the diameters of the glass fibers, or secondary filaments, which are formed by secondarily attenuating the primary filaments, is minimized. Accordingly, glass wool excellent in quality is provided. The temperature of molten glass passing through the orifices in the rotor's wall depends on the temperature of the rotor. In other words, as the temperature of a portion of the rotor, which includes the orifices, is increased, the temperature of molten glass passing through the orifices is increased; and as the temperature of the portion is decreased, the temperature of the molten glass is decreased.

On the other hand, in general, a high speed gas jet stream is employed as a means for secondarily attenuating the primary filament. Owing to the sucking effect of the gas jet stream, air is sucked through a circular hole C of an annular secondary attenuation member B as indicated by the arrow A in FIG. 1. The air passing through the circular hole C facilitates transformation of the molten glass projected through the orifices in the rotor's wall to transition cones of molten glass and then into primary filaments. However, the air thus sucked absorbs heat from the outer surface of the rotor and makes it difficult for molten glass to pass through the orifices. Therefore, maintaining the rotor at a predetermined high temperature by some means is essential to manufacture glass fibers by utilization of centrifugal force. For this purpose, a variety of means for heating the rotor have been proposed in the art. In a typical example of the means, a secondary attenuation jet device is provided, and a rotor heating burner is used to heat the rotor from outside and above. In the means, the flame is applied to the entire outer wall of the rotor including the upper end portion of the rotor. Therefore, in order to protect the aforementioned transition cones of molten glass used to form the primary filaments from breakage, the speed of the flame from the rotor heating burner should not be so high as to cause the secondary attenuation. Thus, a heating-only burner such as a radiation burner must be employed. Accordingly, an attenuating jet stream (high pressure and high temperature steam, in practice) device for subjecting the primary filaments to secondary attenuation must be additionally provided. Therefore, a glass wool spinning machine employing the means is intricate as a whole. Furthermore, as a high pressure and high temperature steam generating device must be used, thermal energy cannot be effectively utilized.

In another means for heating the rotor, a high frequency coil or an induction heater is provided outside of the rotor, so that the induction current of the coil is used to heat the rotor. However, this means is disadvantageous in the following respects. It is necessary to provide a high frequency generating device whose capacity is relatively large to heat the rotor. In addition, it is necessary to provide an electromagnetic shielding means around the glass wool forming machine with a high frequency generating device, to protect the operation from electromagnetic hazards. Therefore, the glass wool forming machine is rather intricate as a whole, and the operability of the machine is rather low.

In another means for heating the rotor, a burner is disposed inside of the rotor, to heat the rotor from inside. However, none of the means of this type is the same as that in the present invention in which a burner is set inside the upper annular flange of a rotor in such a manner that the flame from the rotor goes along the upper surface of the flange, or the upper and lower surfaces thereof, so that heat is transmitted to at least the corner where the upper annular flange and the surrounding wall of the rotor meet, and the direction of the flame is on the prolongation of the upper annular flange and in parallel with the surface thereof.

In the aforementioned conventional means in which a burner is used to heat the rotor from inside, the flame is applied only to the surrounding wall and the bottom of the rotor; that is, the flame is not applied directly to the corner where the upper annular flange and the surrounding wall of the rotor meet. In the conventional means for heating the rotor from inside with a burner, even if a flame is employed as the secondary attenuating jet stream, it is not intended to heat the rotor from outside with the attenuating flame. In order to positively form the primary filaments without breaking the transition cones of molten glass, the secondary attenuating burner is so positioned that the jet flame is not in contact with the rotor. The decrease of the temperature of the rotor outer surface which is caused by the air stream sucked in owing to the suction effect of the secondary attenuating jet stream as described above is compensated by allowing a large amount of flame from the inside burner to contact the bottom and surrounding wall (where heat is greatly radiated) of the rotor.

Since the upper portion of the rotor is substantially closed by the burner, heat is not so greatly radiated from the upper end portion of the rotor. Therefore, heat is supplied to the upper end portion of the rotor as follows. When a large quantity of flame inside the rotor flows from the bottom of the rotor towards the lower end portion of the surrounding wall of the rotor, it rises along the wall after contacting the bottom, thus reaching the inner surface of the upper flange extended from the upper edge of the rotor. As a result, heat is transmitted through the upper flange to the corner (the temperature increase of which is most difficult) where the upper flange and the surrounding wall of the rotor meet. In this manner, the upper end portion of the rotor is heated. Furthermore, a part of the large amount of heat which is applied to the rotor's surrounding wall by the large amount of inside flame is transmitted through the surrounding wall to the aforementioned corner, to heat the latter.

Accordingly, in the conventional means for heating the rotor from inside, it is necessary to supply a larger quantity of fuel gas to the burner positioned inside of the rotor. Thus, a particular device for supplying a large quantity of fuel gas to the narrow or small space in the rotor must be provided.

In each of the above-described three typical conventional means, in addition to the jet flame heat source for secondarily attenuating the primary filaments, a large capacity heat source for heating the rotor is required. Therefore, the conventional means cannot meet recent requirements that energy be economically used.

SUMMARY OF THE INVENTION

The invention provides a glass wool forming device in which molten glass is projected through a number of orifices in the surrounding wall of a hollow-cylinder-shaped rotating spinner, or a rotor, by centrifugal force. Transition cones of molten glass, each having a small circular bottom corresponding to the opening area of a respective orifice are formed. Primary filaments are formed at the tip of each transition cone of molten glass and then advanced into jet flames by centrifugal force so that they are attenuated into secondary filaments. According to the invention, each jet flame for attenuating primary filaments into secondary filaments includes an outer cone of flame (hereinafter referred to as "the outer flame," when applicable) the speed of which is decreased so as to not break the transition cone of molten glass, the outer flame contacting the lower portion of the outer surface of the surrounding wall. Thus, an attenuating blast burner is utilized not only to attenuate the primary filaments into secondary filaments but also to maintain the rotor at a predetermined temperature.

In order that the upper end portion of the rotor (which cannot be maintained at a sufficiently high temperature with the attenuating blast burner) may be effectively heated with a necessary minimum amount of thermal energy, a small capacity burner is disposed inside upper annular flange of the rotating spinner in such a manner that a flame from the burner goes along the upper surface thereof, or the upper and lower surfaces thereof, so that its heat is transmitted to at least a corner where the upper annular flange and the surrounding wall of the rotor meet. The direction of the flame is along the prolongation of the upper annular flange and is in parallel with the surface of the upper annular flange whereby the upper and lower portions of the surrounding wall of the rotor are maintained substantially equal in temperature.

Thus, the present invention has a primary object to use fuel economically and another object to produce glass wool high in quality. The outer cone of the jet flame which is downwardly directed to primarily subject the primary filaments to secondary attenuation (the outer cone of flame being high in temperature although its speed is decreased) is caused to contact the lower end portion of the rotor, from which heat is most greatly dissipated, whereby the lower end portion of the rotor is maintained at a predetermined temperature. A necessary and minimum amount of heat for complementing the amount of heat, which is transmitted upwardly through the metal wall of the rotor (where the latter heat is insufficient to maintain the upper end portion of the rotor at the predetermined temperature), is supplied, under predetermined conditions, from an auxiliary burner which is disposed at a particular position near the upper end portion of the rotor. The jet flame which is used primarily for the secondary attenuation is also maximumly utilized to maintain the rotor at the predetermined temperature, so that the capacity of the auxiliary heating means for maintaining the temperature of the rotor uniform can be minimized.

Other objects and advantages of this invention will be apparent from a reading of the following specification and claims taken with the drawing.

BRIEF DESCRIPTION OF THE DRAWINGS

FIG. 2 is a vertical sectional view of a portion of FIG. 1.

DETAILED DESCRIPTION OF PREFERRED EMBODIMENTS OF THE INVENTION

Figure 1:
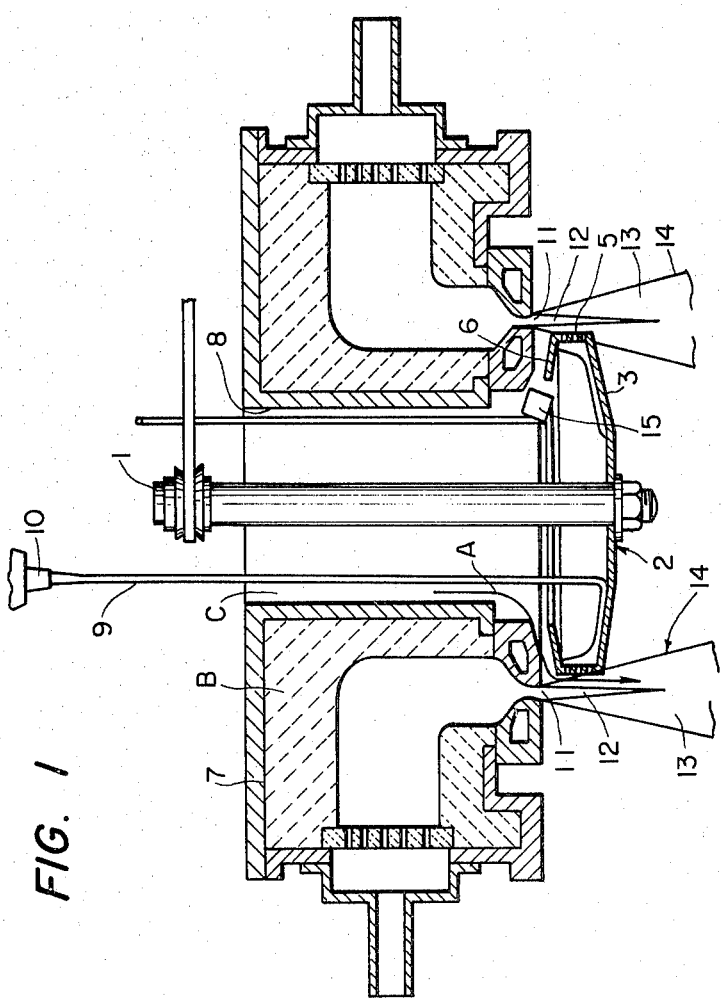
FIG. 1 is a vertical sectional view of an illustrative embodiment of a glass fiber forming unit according to the invention.

Reference should be made to the drawing where like reference numerals refer to like parts.

As shown in FIGS. 1 and 2, a hollow-cylinder-shaped rotating spinner 2 (called a rotor) is fixedly secured to the lower end of a rotary shaft 1. The rotating spinner 2 is made up of a bottom 3, a cylindrical wall 5 having a number of orifices (small holes) 4 for projecting molten glass, and an upper annular flange 6 extended inwardly from the upper edge of the wall 5. The rotating spinner 2 is surrounded by an attenuating blast burner 7 having an annular inner member 8. The rotary shaft 1 is disposed in the annular inner member 8. Molten glass 9 is supplied from a bushing (nozzle) 10 through the annular inner member 8 into the rotating spinner 2.

The attenuating blast burner 7 has jet flame orifices 11 from each of which a jet flame 14 consisting of a relatively high speed inner flame 12 and a relatively low speed outer flame 13 is jetted.

These jet flames 14 are used to attenuate primary filaments (or threads), which are formed at the ends of transition cones of molten glass projecting from the orifices 4 in the wall 5 of the rotating spinner 2, into secondary filaments. The speed of the inner flames 12 is high enough to attenuate the primary filaments into secondary filaments while the speed of the outer flames 13 is low enough that they will not break the transition cones of molten glass projecting from the orifices. The jet flame orifices 11 of the attenuating blast burner 7 are so positioned that only the outer flames 13 of the jet flames 14 are brought into contact with the outer surface of the wall 5 of the rotating spinner.

A heating burner 15 is provided inside of upper annular flange 6 of rotating spinner 2. The heating burner 15 jets a flame 16 in a direction which is on the prolongation of the upper annular flange 6 and in parallel with the surface of flange 6. The heating degree of burner 15 is such that, as the flame 16 goes along the upper surface of upper annular flange 6 or along the upper and lower surfaces thereof, the heat reaches at least a corner 17 where the upper annular flange 6 and the wall 5 meet.

The glass fiber forming unit thus constructed operates as follows: The molten glass 9 supplied from a glass melting furnace (not shown) flows down at a predetermined flow rate from the bushing 10. Immediately when the molten glass 9 reaches the bottom 3 of the rotating spinner 2, it is distributed to the inside of the wall 5 and is then projected outside the wall 5 through the orifices 4 by centrifugal force. As a result, transition cones of molten glass are formed, each having a bottom corresponding to the opening area of a respective orifice 4. Primary filaments extend from the tips or apexes of the transition cones and are then brought to the inner flames 12 of the jet flames. Being attenuated by the inner flames 12, the primary filaments are formed into secondary filaments. These secondary filaments are the glass fibers which are used to form glass wool.

Since the attenuating blast burner 7 is used to attenuate the primary filaments into secondary filaments, or glass fibers, the flame jet speed of the burner 7 should be sufficiently high to effect this function. Therefore, the positional relationship of the jet flames 14 from the jet flame orifices 11 of the burner 7 with respect to the outer surface of wall 5 is important. Accordingly, only the outer flames 13 of jet flames 14 (the speeds of which are decreased to the extent the transition cones of molten glass are not broken) are brought into contact with the outer surface of the wall. The case where the jet flames 14 from the orifice 11 of the attenuating blast burner do not satisfy this requirement, will now be described.

First, the case where the outer surface of wall 5 is completely (from the upper end to the lower end) in the inner flames 12, having a speed high enough to attenuate the primary filaments into the secondary filaments, will be described. In this case, as the molten glass projected through the orifice 4 is immediately brought into contact with the flames 12, no transition cones of molten glass are formed, and accordingly, no primary filaments are formed. That is, immediatedly when the molten glass is projected through the orifice 4, it is adhered to the outer surface of the wall 5 to form a molten glass layer thereon. Since the molten glass is continuously projected, when the molten glass layer coated on the outer surface of the wall 5 reaches a certain value, it is delivered out in the form of irregular particles or irregular diameter fibers. Thus, it is impossible to form normal glass fibers. This is due to the following reason: As the jet flame 14 has both the temperature and speed which are high enough to attenuate the primary filaments into secondary filaments, the jet flame 14 causes the molten glass projecting through the orifice 4 to strike against the outer surface of the wall before the primary filament is formed; that is, there is no space and time for formation of the transition cone of molten glass and accordingly the primary filament. In order to form normal glass fiber, there must be sufficient space and time to allow the formation of the primary filament. This is one of the reasons why the positional relationship between the jet flame 14 and the wall 5 is defined.

On the other hand, in order to cause the jet flame 14 to attenuate the primary filament into the secondary filament, the vertical distance between the jet flame orifices 11 and the rotating spinner 2 should be reduced as much as possible; that is, the burner 7 and the rotating spinner 2 must be so relatively positioned in a distance range such that the speed of the jet flame 14 is not significantly decreased. As the jet flame 14 advances downwardly from the jet flame orifice 11 in the attenuating blast burner 7, its speed is decreased while its width is being increased. In the glass fiber forming unit of the invention, the lower end of the outer surface of the wall 5 is so positioned that, even when the molten glass contacts the outer flame 13 whose width has been spread with the decreasing speed of the jet flame 14, the primary filament is satisfactorily formed. In other words, the ring of jet flames 14 is set as close to the lower end of the outer surface of the wall 5 as possible in the range that, even when the lower end of the outer surface of the wall 5 is in contact with the outer flame 13 whose width is increased, the primary filaments can be formed.

The reason for the foregoing will be further described. The molten glass is projected outside of the wall 5 through the orifices. If, in this case, the wall 5 is at a low temperature, the temperature of the molten glass is decreased while the molten glass passes through the orifice 4. As a result, the viscosity of the molten glass is increased, and accordingly the amount of molten glass passed through the orifice 4 is so small that it is impossible to form a predetermined glass fiber, or sometimes no molten glass can pass through the orifices 4. Consider the case where the lower end of the wall 5 outer surface is in contact with outer flames 13 whose width is increased as the jet flame 14 advances downwardly. If, in this case, the speed of the outer flames 13 is decreased to the extent that the primary filaments can be formed from the transition cones of molten glass, it is preferable that wall 5 is set as close to the outer flame 13 as possible to maintain the wall at high temperature thereby to prevent the decrease of temperature of the molten glass passing through the orifices 4. Under this condition, a necessary amount of molten glass for formation of the predetermined glass fiber is allowed to pass through the orifices 4 to the outside of the wall, to form the primary filament. The filaments are subjected to secondary attenuation in the jet flame 14. Thus, the secondary filaments can be obtained which is the glass fiber for forming glass wool.

The behavior of the jet flames 14 from the jet flame orifices 11 is as follows: Immediately when jet flames 14 consisting of outer flames 13 and inner flames 12 come out of the jet flame orifices 11, i.e. when they are above the upper end of rotating spinner 2, the speed of jet flames 14 is relatively high, and accordingly the outer flame 13 is not developed so greatly; that is, the width of the outer flame 13 is not so wide. Accordingly, the upper end of rotating spinner 2 is not sufficiently in contact with the outer flame 13 when compared with the lower end, and therefore it is rather difficult to increase the temperature of the upper end. On the other hand, the molten glass 9 is supplied to the rotating spinner 2 as follows: The molten glass which has reached the bottom 3 of rotating spinner 2 is distributed to the inner surface of the wall 5 by centrifugal force. The molten glass thus distributed is caused to rise along the inner surface of the wall 5, while the temperature of the molten glass is absorbed by the bottom 3 and the wall 5. Accordingly, the molten glass which has reached the upper end of the wall 5 is lower in temperature than the molten glass remaining at the lower end of the wall 5. Thus, the decrease of temperature of the molten glass at the upper end of the wall, which is caused by the fact that the temperature of the molten glass is absorbed while rising along the inner surface of the wall as described above, is compounded due to the difficulty in increasing the temperature of the upper portion of the wall, which is caused by the fact that the width of the jet flame 14 is smaller when the jet flame 14 is over the upper portion of the wall as described above. As a result, the upper portion of the wall is lower in temperature than the lower portion.

In this connection, the case where the effective heating means such as burner 15, which is one of the specific features of the invention is not employed for the upper end portion of the rotating spinner 2, will be described. In this case, the molten glass passing through the orifices 4 positioned in the upper portion of the wall 5 is lower in temperature and larger in viscosity than that passing through the orifices 4 positioned in the lower portion of the wall 5. Accordingly, the molten glass passing through the upper orifices 4 is larger in fluid resistance. Thus, the amount of molten glass passing through the upper orifices 4 is smaller than that passing through the lower orifices 4. Accordingly, the primary filaments made of the molten glass projected outside wall 5 from upper orifices 4 are smaller in diameter than those projected outside wall 5 from the lwer orifices 4. These smaller diameter primary filaments are attenuated by the jet flames 14 which have been jetted from the orifices 11 and are accordingly at high speed. On the other hand, the larger diameter primary filaments which come out of the lower orifices 4 are attenuated into secondary filaments by jet flames 14 which flow downwardly with decreasing speed. Accordingly, the secondary filaments obtained by attenuating the primary filaments which come out of the upper orifices 14 are much smaller in diameter than those obtained by attenuating the primary filaments which come out of the lower orifices. That is, if, when the important condition of the invention, that is the positional relationship between the jet flame 14 and the lower portion of the outer surface of the wall 5, is satisfied, the also important condition of the invention, that is the use of the effective heating means for the upper portion of the rotating spinner is not satisfied, then the secondary filaments from the upper portion of the wall 5 are small in diameter, while the secondary filaments from the lower portion of the wall are large in diameter. As a result, glass wool formed with these secondary filaments is extremely low in quality, being non-uniform in fiber diameter.

In the invention, one of its important conditions, that is the positional relationship between the attenuating jet flame and the outer surface of the wall, is satisfied to avoid difficulties in forming primary filaments which would result from breakage of the transition cone of molten glass by the attenuating jet flame. The outer flames 13, which are low in speed and high in temperature, contact the lower portion of the outer surface of the wall 5—that is, the jet flame is effectively utilized to supply a larger part of the amount of heat which is required to maintain the rotating spinner 2 at the predetermined temperature. Furthermore, heating burner 15, which satisfies another important condition of the invention, is disposed inside of the upper annular flange 6 in such a manner that its flame goes along its upper surface, or its upper and lower surfaces, to transmit heat to at least the corner 17 where the annular flange 6 and the wall 5 meet. The flame is extended along the prolongation of the upper annular flange 6 and in parallel with its surface (where the angle T in FIG. 2 is usually 60 to 90°) whereby the upper end portion of the wall 5 is effectively heated with a necessary and minimum amount of fuel which is, for instance, 3 to 4% of the amount of fuel required for the attenuating blast burner 7. As a result, the upper and lower portions of wall 5 are equally maintained at high temperatures so that the primary filaments are uniform in diameter, and accordingly the secondary filaments for forming glass wool are also uniform in diameter.

Although the glass fiber forming unit according to the invention which satisfied the above-described conditions is considerably simple in construction, it can provide glass wool with a small amount of fuel. Furthermore, the glass fiber forming unit is small in size and high in work efficiency.

It is to be understood that the above detailed description of the various embodiments of the invention is provided by way of example only. Various details of design and construction may be modified without departing from the true spirit and scope of the invention as set forth in the appended claims.

What is claimed is:

1. In a glass fiber forming unit including a hollow-cylinder-shaped rotating spinner having (a) a bottom, (b) a surrounding wall having upper and lower outer surfaces and with a number of molten glass projecting orifices where the molten glass projects from each orifice such that a transition cone of the glass is formed with its base at the orifice and primary filaments of the glass extending from the apex of the cone, and (c) an upper annular flange extending inwardly from the upper edge of said surrounding wall; and an attenuating blast burner with jet flame orifices for attentuating primary filaments formed at the tips of transition cones of molten glass projecting from said rotating spinner into secondary filaments where the jet flame comprises an inner cone of flame surrounded by an outer cone of flame, the speed of the inner flame being greater than that of the outer flame, the improvement comprising said jet flame orifices in said attenuating blast burner being so positioned with respect to the surrounding wall hollow-cyliner-shaped rotating spinner that, for each jet flame from each jet flame orifice, (1) the inner cone of flame (a) contacts said primary filaments to attenuate them into the glass fibers due to the high speed of this flame and (b) does not contact said transition cones sufficiently to break them even though the speed thereof is sufficient to do so and (2) the outer cone of flame is in substantial contact with only the lower outer surface of said surrounding wall of said hollow-cylinder-shaped rotating spinner where the speed of said outer cone of flame is such as to not break said transition cones, and a heating burner disposed inside said upper annular flange of said hollow-cylinder-shaped rotating spinner for jetting a flame in a direction which is along the prolongation of said upper annular flange and which is in parallel with the surface of said upper annular flange, said flame from said heating burner heating said rotating spinner in such a manner that said flame goes along at least the upper surface of said upper annular flange to transmit heat to at least a corner where said upper annular flange of said hollow-cylinder-shaped rotating spinner and said surrounding wall meet such that the heat supplied to the upper surface of the surrounding wall by the heating burner and the heat supplied to the lower surface thereof by said outer cone of flame results in a substantially uniform temperature of the surrounding wall to thereby enhance fiber glass uniformity.

2. The improvement as in claim 1 where said flame from the heating burner goes along the upper and lower surfaces of the upper annular flange.

3. In a method of forming glass fiber in a unit including a hollow-cylinder-shaped rotating spinner having (a) a bottom, (b) a surrounding wall having upper and lower outer surfaces and with a number of molten glass projecting orifices where the molten glass projects from each orifice such that a transition cone of the glass is formed with its base at the orifice and primary filaments of the glass extending from the apex of the cone, and (c) an upper annular flange extending inwardly from the upper edge of said surrounding wall; and an attenuating blast burner with jet flame orifices for attenuating primary filaments formed at the tips of transition cones of molten glass projecting from said rotating spinner into secondary filaments where the jet flame comprises an inner cone of flame surrounded by an outer cone of flame, the speed of the inner flame being greater than that of the outer flame, the improvement comprising directing each jet flame from each jet flame orifice, so that (1) the inner cone of flame (a) contacts said primary filaments to attenuate them into the glass fibers due to the high speed of this flame and (b) does not contact said transition cones sufficiently to break them even though the speed thereof is sufficient to do so and (2) the outer cone of flame is in substantial contact with only the lower outer surface of said surrounding wall of said hollow-cylinder-shaped rotating spinner where the speed of said outer cone of flame is such as to not break said transition cones, and jetting a flame in a direction which is along the prolongation of said upper annular flange and which is in parallel with the surface of said upper annular flange, said flame from said heating burner heating said rotating spinner in such a manner that said flame goes along at least the upper surface of said upper annular flange to transmit heat to at least a corner where said upper annular flange of said hollow-cylinder-shaped rotating spinner and said surrounding wall meet such that the heat supplied to the upper surface of the surrounding wall by the heating burner and the heat supplied to the lower surface thereof by said outer cone of flame results in a substantially uniform temperature of the surrounding wall to thereby enhance fiber glass uniformity.

4. The improvement as in claim 3 where said flame from the heating burner is directed along the upper and lower surfaces of the upper annular flange.

* * * * *